Figure 1:
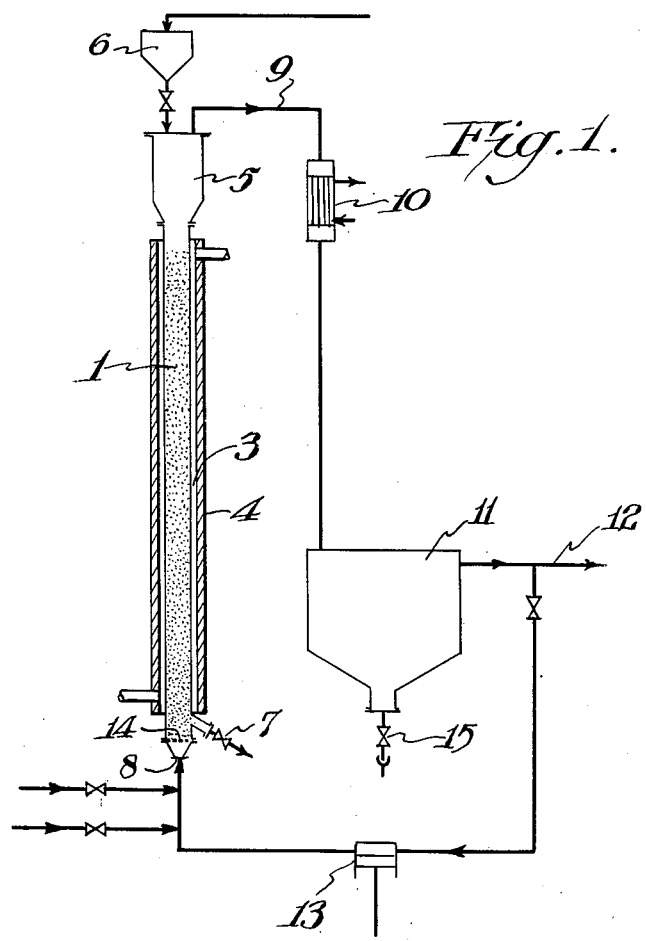

Feb. 19, 1952 G. BARNHART ET AL 2,586,598
PROCESS FOR CHLORINATING PHTHALOCYANINE COLORING MATTERS
Filed April 30, 1949 2 SHEETS—SHEET 2
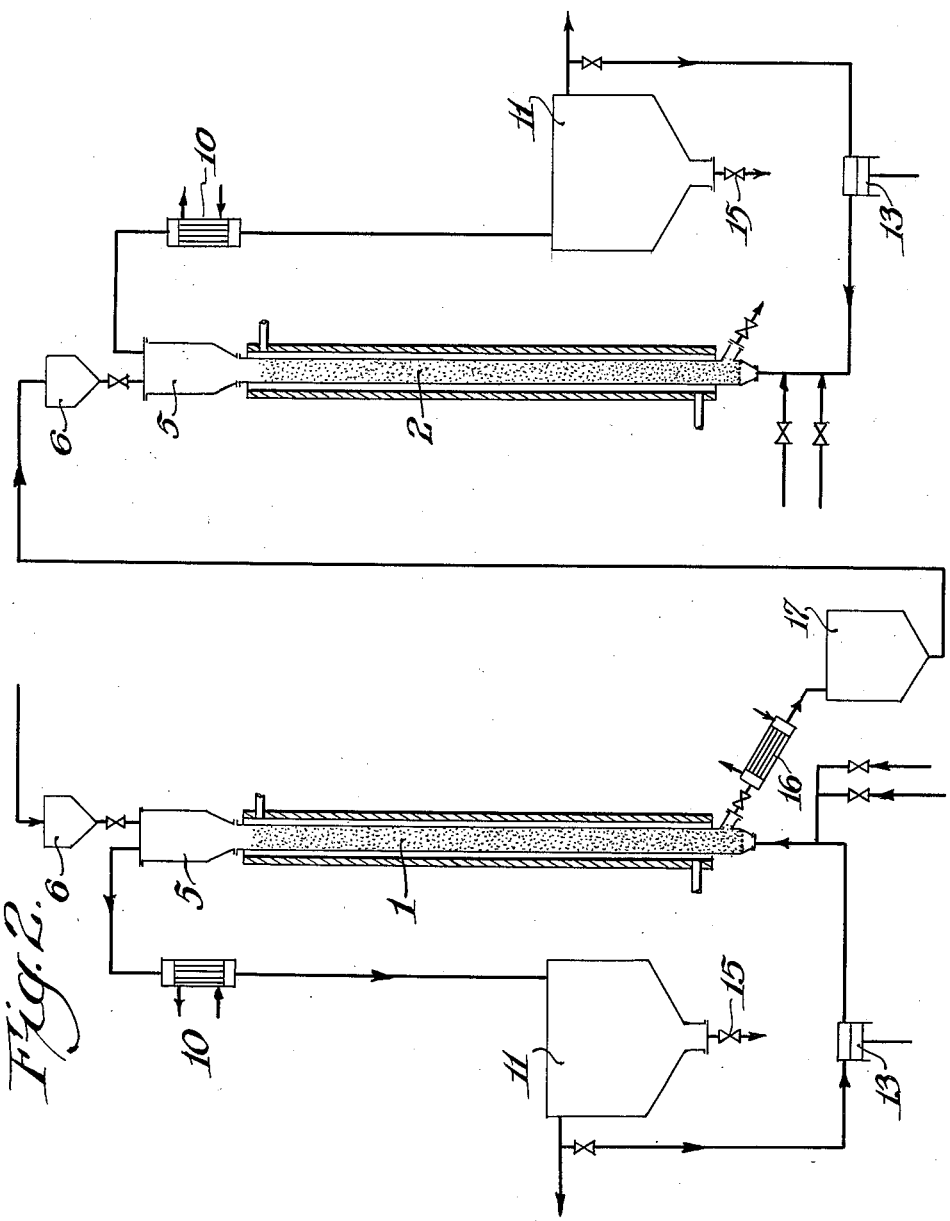
INVENTORS
GEORGE BARNHART and
ROBERT WARREN GRIMBLE
BY
David Katz.
ATTORNEY Patented Feb. 19, 1952

2,586,598

UNITED STATES PATENT OFFICE 2,586,598

PROCESS FOR CHLORINATING PHTHALO-
CYANINE COLORING MATTERS

George Barnhart, Newark, Del., and Robert Warren Grimble, Woodbury, N. J., assignors to E. I. du Pont de Nemours & Company, Wilmington, Del., a corporation of Delaware Application April 30, 1949, Serial No. 90,632

10 Claims. (Cl. 260—314.5)

This invention relates to the chlorination of phthalocyanine pigments. More particularly, this invention deals with a method for chlorinating phthalocyanine pigments on a commercial scale to produce highly chlorinated derivatives thereof.

As is well known, copper-phthalocyanine shifts its shade steadily from blue toward green if its nuclear hydrogen atoms are replaced one after the other by chlorine. The shift, however, becomes abrupt and very pronounced, when the quantity of chlorine thus introduced passes beyond 43% by weight, which corresponds to 12 Cl atoms per molecule. Similar shifts, with a similar final abrupt change are observed in other metal phthalocyanines as well as in metal-free phthalocyanine. Accordingly, phthalocyanine compounds having from 14 to 15 Cl atoms per molecule, hereinafter referred to as polychloro phthalocyanines, are of considerable commercial interest.

Unfortunately, the production of the higher halogenation stages also becomes increasingly difficult. As the molecule becomes saturated with chlorine, it acquires an increased resistance to further chlorination, and requires more drastic chlorinating conditions. Thus, in chlorinating the dry pigment with gaseous chlorine, temperatures above 350° C. in the case of metal-free phthalocyanine, and above 400° C. in the case of copper-phthalocyanine, are required for forcing-in the last 2 or 3 halogen atoms, above the $Cl_{12}$ stage. Lower temperatures for this last chlorination stage are so slow in operation that they can hardly be considered for commercial scale production.

It has been suggested in the art to effect the higher chlorination stages by suspending the color in a liquid or molten diluent, capable of withstanding high temperature. Thus, Detrick and Johnson in U. S. P. 2,253,560 suggest halogenation in a molten eutectic mixture of aluminum chloride and sodium chloride. Fox and Johnson in U. S. P. 2,377,685 suggest the use of sulfur dichloride in a sealed vessel. Each of these, however, has its own economic drawbacks. The first mentioned process, for instance, consumes large quantities of the relatively expensive aluminum chloride; the second one is toxic and corrosive. Both processes require subsequent treatment of the color to separate the same from the molten diluent or solvent.

It is accordingly an object of this invention to provide a practical process for producing polychloro phthalocyanines in an economical manner. A further object is to provide a process enabling one to chlorinate phthalocyanine compounds in solid state, without the use of liquid diluents. Other important objects of this invention will appear as the description proceeds.

The idea of treating copper-phthalocyanine in solid state with chlorine is per se not novel, but it has been a practical failure hitherto because of the difficulties of local overheating, which results in injury to the color. It occurred to us that we could solve the problem of local overheating by employing a fluid-bed reactor, using a stream of chlorine, with or without an inert diluent, in the joint function of chlorinating agent and fluidizing gas. But we were dismayed soon to discover that copper-phthalocyanine packed badly in the column, channelled, and refused to be fluidized. To understand the terminology employed and the nature of the difficulties encountered, we must pause here to discuss fluid-bed reactors and their behavior.

The fluidization of solids has been reviewed recently in a series of articles in the chemical engineering literature; see for instance, Chem. & Met. Eng. for June, 1944, pp. 94–98.

The apparatus is generally speaking a vertical tube with a downwardly converging, conical bottom. Solid material in powdered form fills the column to about half its height, and a stream of gas at a controlled velocity is fed-in through the apex of the cone at the bottom. As it rises, the gas agitates the solid, suspends it, and causes the whole mass to "boil" or play like a fountain. This is the so-called "dense phase" of fluidization. If the velocity of the gas is increased, the interface between the "fluid" bed and the gas above it disappears, the solid particles become homogeneously suspended in the stream, and may be carried by it out of the vessel. This is known as the "lean phase" or "light phase." In the present specification, wherever we speak of fluidization we shall have in mind the dense phase only.

It is well known that to achieve successful fluidization of a solid, careful attention must be paid to the physical condition of the solid, such as size and the uniformity thereof. In our case, we find that these two factors are probably less important than shape. Thus, crude copper-phthalocyanine, which is characterized by a needle-like crystalline structure, packs badly in the fluidization column and prevents the free "boiling" characteristic of a fluidized mass.

Now, in accordance with this invention, we have further found that said problem of packing in the fluidization column can be neatly eliminated by preparing the pigment in a form wherein it is both finely divided and extended in a thin film upon an inert substratum. For this purpose, the pigment and from 1 to 10 times its weight of an alkali-metal chloride are milled jointly in a ball mill with steel balls or ceramic pebbles until the salt particles become coated with the pigment, but not much beyond this point. We then use this salt-pigment mixture directly, that is without extracting the salt, and find that the relatively coarse salt particles lend themselves readily to fluidization, while the pigment, being extended over the surface of the salt particle, offers ready access to the chlorine.

We further find that whereas polychlorination, that is introduction of the final 2 or 3 chlorine atoms, requires drastic conditions, to wit high temperatures (above 350° C.) and concentrated chlorinating gas (above 50%, preferably 80% to 100% by volume), the lower chlorination stages (that is up to 12 Cl atoms) give a better product under milder conditions. Indeed, we find that best results are obtained if the severity of chlorination is graudated as the compound goes from the stage of zero chlorine to the stage of 12 Cl atoms per molecule. Such graduation may be achieved by gradually building up the concentration of chlorine in the fluidizing stream, say from about 2% to about 80% by volume and simultaneously building up the temperature from about 200° C. to about 350° or 400° C., over the course of 2 or 3 hours. These conditions, however, are not absolute, inasmuch as one may also keep the chlorine stream at a steady concentration, say at 50% by volume, while controlling the intensity of chlorination purely by control of temperature, and vice versa. In any event, our experience has taught us that it is best to divide the chlorination into two distinct stages which are distinguished from each other in degree of chlorination-intensity, to wit temperature of the reaction mass and concentration of the chlorinating stream employed.

The function of the first stage is to chlorinate the initial material from zero (or from its initial chlorination stage, say monochloro, tetrachloro or octachloro, if such be selected as initial material) to a state of about 12 Cl atoms per molecule (more or less). As already indicated, this stage is carried out by treating the material, in the dense, fluidized state, with a chlorinating mixture consisting of chlorine diluted with hydrogen-chloride or chlorine diluted with nitrogen, and at a temperature for the most part below 350° C.

The rule at this stage is that the chlorine concentration and temperature applicable to the reaction mass shall be graduated in accordance with the average chlorine content combined with the phthalocyanine mass at any given instant. Using temperatures and concentrations below these values does no harm; but exceeding these values, especially in temperature, degrades the product and may even result in complete stoppage of the fluidization process due to packing and channelling.

The second of the mentioned stages consists of flooding the color at a temperature above 350° C. (preferably 410° to 430° C., in the case of copper-phthalocyanine) with a concentrated chlorinating mixture. By "concentrated," we mean a chlorine content of over 50%, preferably 80 to 100% by volume. The diluent may be nitrogen or hydrogen-chloride. By "flooding" we mean that the gaseous mixture is fed in at a rate sufficient to keep the reaction column in the dense fluidized state and without regard to chlorine consumption. As a result of such high rate of chlorine-feed, the exhaust gases are rich in chlorine, and should preferably be recirculated or otherwise collected for re-use.

In the case of metal-free phthalocyanine, the optimum temperature of the second stage is somewhat lower, say within the range of 360° to 380° C.

The function of the second stage is to raise the chlorine content of the color from about $Cl_{12}$ to about $Cl_{14}$ or $Cl_{15}$. For simplicity, this stage will be referred to hereinbelow as the soaking operation.

If a $Cl_{10}$ to a $Cl_{12}$ product is available from some other source, the aforesaid first stage clearly need not be applied. In that event, the partially chlorinated pigment is milled with an alkali-metal chloride as above indicated, to the point where the salt particles become coated with the pigment, and the mixture is then subjected directly to the "soaking treatment" in a fluid-bed reactor as hereinabove taught.

Having now described the essential conditions for making the fluidized bed reactor applicable to phthalocyanine colors, we shall now describe the apparatus employed, it being understood, however, that the description is merely illustrative and that our invention is by no means limited to this or any other particular type of equipment.

In Figure 1 is shown in a schematic way (in vertical section) the apparatus employed in a simple lay-out, usable for an intermittent or batch process, or even for a continuous process if the $Cl_{12}$ compound is the ultimate goal.

In Figure 2 is shown (in vertical section) an apparatus lay-out for conducting a semi-continuous process, wherein the first stage is carried out continuously in one column, while the second stage is effected batchwise in the second column.

Referring now to Figure 1 in detail, the reactor 1 is an elongated vertical tube, suitably heated or cooled and insulated. For instance, heat may be supplied by means of electrical resistance elements (not shown) fastened to the outside of the reactor, and cooling may be obtained by blowing air through an annular space 3 between the reactor 1 and an insulating jacket 4. The reactor is preferably surmounted by an expansion chamber 5 in which the effluent gas velocity is reduced to cause part of the solids carryover to settle back into the reactor by gravity. Copper-phthalocyanine in a form suitable for fluidization such as a copper-phthalocyanine extended on alkali-metal chloride as described above, is charged either batchwise or continuously to the reactor 1 near the top through hopper 6. The chlorinated copper-phthalocyanine product is withdrawn batchwise or continuously at 7, near the bottom of the reactor. A chlorinating and fluidizing gas stream is fed in at 8. The effluent gases pass through pipe 9, are cooled in cooler 10, and are passed through a bag filter 11 to remove from the gas all the solids carried out of the reactor. The clean gas from the bag filter is either exhausted from the system at 12 or compressed and returned to the reactor by compressor 13. The feed gas to the reactor is preferably distributed evenly across the reactor cross-section by passing through a porous plate 14. Carryover solids collected in the bag filter are withdrawn periodically at 15 and recharged to the reactor.

In Figure 2 is shown a tandem layout, wherein the pigment material is continuously fed into one fluid-bed reactor to undergo there the first stage of chlorination, while the partially chlorinated material thus obtained is fed batchwise into a second column, to receive there the second stage of chlorination. In this figure, the first fluid-bed reactor 1 is operated to produce a continuous stream of partially chlorinated copper-phthalocyanine, which is then discharged from the reactor through a solids cooler 16 to an intermediate storage bin 17. Material from this bin is charged batchwise to the second reactor 2 for finishing the chlorination to the polychloro stage, contianing 14 to 15 chlorine atoms per molecule. Other equipment in each of these columns is essentially the same as shown in Figure 1.

Without limiting our invention, the following examples are given to illustrate our preferred mode of procedure.

Example 1

386 lbs. of crude copper-phthalocyanine was milled with 1158 lbs. of sodium chloride for seven hours in a ball mill, using 4700 lbs. of 1.5" to 2" flint pebbles as grinding media. 358 lbs. of this mixture were charged to a 1'-dia. by 20' tall, vertical reactor. The charge was fluidized with nitrogen and heated to 200° C., at which temperature the chlorine feed was started.

The concentration of chlorine in the gas feed was gradually built up, over a period of about 3 hours, from an initial 2% to a final 100%, while the temperature was simultaneously increased gradually to about 415° C. The chlorine concentration of 100% and a temperature of 415° to 420° C. were then maintained for a period of 3 hours.

At the end of this period, the charge was cooled and discharged. The crude product, after extraction of the salt and acid pasting, analyzed 48.6% chlorine and matched commercial standards in tinctorial properties.

Example 2

30 lbs. of metal-free phthalocyanine and 60 lbs. of table salt were milled with 275 lbs. of 1.5" to 2" flint pebbles, in a 55-gallon ball mill for seven hours. 5 lbs. of this mixture were then charged to a 3"-diameter 80"-long, vertical glass reactor tube, fluidized with nitrogen and heated to 135° C. At this temperature chlorine feed was started at a concentration of 15 volume per cent (the remainder being nitrogen). The temperature and chlorine concentration in the feed gas were increased gradually over the next two hours to a chlorine concentration of 100% and a temperature of 380° C. The chlorine concentration in the feed gas was maintained at 100% and the temperature at approximately 380° C. for one hour, at the end of which the chlorine feed was stopped and the bed was cooled while fluidizing with nitrogen. The resultant product was finished by salt milling in accordance with U. S. P. 2,402,167, following which the salt was extracted and the pigment was dried. The product contained 49.4% chlorine, which corresponds to a chlorine content of about 14 atoms per molecule.

Example 3

350 lbs. of a copper-phthalocyanine-salt mixture made in the fashion described in Example 1 above was charged to a 1'-diameter by 20'-long vertical tubular reactor. The charge was fluidized with nitrogen and heated to 200° C., at which temperature the chlorine feed was started. The chlorine concentration and temperature were gradually built up from 2% at 200° C. to 50% at 360° C. over a period of 2 hours. A chlorine concentration of 50% and a temperature of 360° to 380° C. were then maintained for another hour. The inert gas diluent was hydrogen chloride, recovered from the exit gases of the same reactor.

At the end of the above period, a continuous feed of copper-phthalocyanine-salt mixture was started at a rate of 120 lbs. per hour, with simultaneous withdrawal of enough chlorinated material to keep a constant volume of solids in the reactor. The chlorine concentration of fifty per cent by volume and reactor-temperature of 360° to 380° C. were maintained. Operating in this manner, a product containing approximately twelve chlorine atoms per molecule was produced continuously at a rate of 52 lbs. per hour, calculated on a 100%-pigment basis.

Example 4

A two-reactor system as illustrated in Figure 4 was employed, both reactors being 1' in diameter by 20' tall. The first one was operated in a continuous manner in the fashion described in Example 3 above, to produce a product containing about twelve chlorine atoms per molecule. This product was discharged into an intermediate storage vessel, and then treated batchwise in the second reactor. Each batch consisted of 400 lbs. and was heated to 350° C., while being fluidized with nitrogen. At 350° C. the nitrogen was shut off and chlorine feed started, the temperature being increased to 400°–420° C. The treatment with chlorine at this temperature was continued for two hours, whereupon the mass was cooled and discharged. The product contained 14 chlorine atoms, and met commercial standards in quality.

It will be understood that the above examples are merely illustrative, and that many variations in the details thereof may be practiced without departing from the spirit of this invention.

Thus, the temperature and chlorine-concentration at the various stages indicated in the several examples may be varied considerably within the general limits indicated.

The velocity of the gaseous stream is gaged by its effect on the column of powder. It should be sufficiently strong to put the column into the dense fluidized state, but of course not so strong as to bring about the lean phase.

Nitrogen has been named as the inert gaseous diluent in some of the examples above. In lieu of this, any other convenient diluent or mixture of diluents may be employed. Indeed, if the exhaust gases from such examples be re-circulated, the diluent will be a mixture of nitrogen and HCl, due to the formation of the latter in the chlorination process. From the latter viewpoint, it is therefore preferable to employ hydrogen chloride as diluent ab initio; then the re-circulated gases are of the same qualitative composition as the initial gas, and may be readily adjusted (by adding $Cl_2$) to the requisite quantitative composition for the particular material to be treated or its stage of chlorination.

In the salt-coating step prior to fluidization, sodium chloride may be replaced by potassium chloride. At the end of the chlorination process, it is recommended to subject the product to a salt-milling process (U. S. P. 2,402,167), which is carried to exhaustion, that is to the point where the pigment is reduced to an extremely fine particle-size equivalent in degree of subdivision to acid-pasted material. The milled product is then washed with water to leach out the salt. Alternatively, the salt-milling procedure at this stage may be replaced by acid-pasting (drowning a concentrated sulfuric acid solution of the color in a large volume of water), or any other procedure for reducing the pigment to the desired degree of fineness for use in paints and inks.

In the claims below the terms "fluidization," "fluidized state," and the like shall be understood as referring to the state of a comminuted solid which is not suspended in a liquid but which is being suspended and agitated by a vertical stream of gas to the point where the solid mass appears to play like a fountain but retains nevertheless a distinct interface between its own collective body and the body of gas above it. This definition implies a sufficient velocity in the stream of gas to produce the mentioned effects, but does not embrace any limitations as to the temperature of the gas and implies the absence of liquids.

We claim as our invention:

1. The process of producing a highly chlorinated phthalocyanine compound, which comprises treating a phthalocyanine compound of lower chlorine content than the highly chlorinated state desired and while said compound is in powdered state and coated on the surface of a granular solid, inert diluent, with a vertical stream of a gas comprising gaseous chlorine, said stream having a velocity sufficient to fluidize the granular coated mass.

2. In the process of chlorinating a phthalocyanine color in dry state with gaseous chlorine, the improvement which consists of subjecting the color to ball-milling jointly with an alkali-metal chloride, the degree of milling being not greater than that required to coat the salt particles with said color, and treating said coated salt particles in a vertical column with a vertical stream of a gas comprising gaseous chlorine, said stream having a velocity sufficient to fluidize the granular coated mass.

3. In a process for chlorinating a phthalocyanine pigment in solid form to a stage higher than 12 Cl atoms using gaseous chlorine, the improvement which consists of preparing the color physically for the desired chlorination by grinding the same jointly with from 1 to 10 times its weight of an alkali-metal chloride, and discontinuing the grinding at the stage where the pigment becomes coated onto the particles of the alkali-metal chloride, whereby to obtain an intermediate granular product consisting of salt particles coated with pigment and adapted for fluidization by the aid of a gaseous medium.

4. In a process for chlorinating a phthalocyanine pigment in solid form to a stage higher than 12 Cl atoms using gaseous chlorine, the improvement which comprises preparing the color physically for the desired chlorination by extending the same in a thin film on an alkali-metal chloride, then exposing the extended color under agitation to a stream of gas comprising chlorine, the exposure being effected in a plurality of stages of progressively increasing chlorinating intensity, the last stage being characterized by a chlorine stream of at least 50% strength and a temperature of at least 350° C.

5. A process for chlorinating copper-phthalocyanine pigment in solid state to a stage higher than 12 Cl atoms, which comprises forming a mixture of copper-phthalocyanine containing about 10 to 12 Cl atoms per molecule and an alkali-metal halide in finely divided form, the pigment being extended over the surface of the alkali metal halide particles, and subjecting said mixture under agitation to the action of a gaseous chlorinating stream containing at least 50% of chlorine by volume, at a temperature between 380° and 430° C.

6. A process for chlorinating copper-phthalocyanine pigment in solid state to a stage higher than 12 Cl atoms, which comprises extending chlorine-free copper-phthalocyanine in a thin film on a finely divided, alkali metal halide, chlorinating the extended pigment to a stage of about 10–12 Cl atoms per molecule, then subjecting the pigment under agitation to the action of a gaseous chlorinating stream containing at least 50% of chlorine by volume, at a temperature between 380° and 430° C.

7. The process of treating a phthalocyanine pigment in dry state with gaseous chlorine to produce a highly chlorinated compound, which comprises subjecting the pigment in finely divided state and while extended over the surface of a granular alkali-metal chloride to treatment with a vertical stream of gas comprising chlorine and having a sufficient velocity to maintain said granular salt-pigment mass in fluidized state, said treatment being applied in two distinct stages, the first of which is characterized by gradual heating from about 135° C. to about 350° C. whereby to complete the lower chlorination stages at this heating stage, and the second stage being characterized by maintaining the mass at a substantially constant temperature above 350° C., whereby to introduce the final atoms of chlorine.

8. The process of producing a highly chlorinated copper-phthalocyanine, which comprises treating copper-phthalocyanine in dry, finely divided state and while extended over the surface of a granular alkali-metal chloride with a fluidizing gaseous stream comprising chlorine and an inert gas at a temperature increasing gradually from about 200° C. to about 410° C., whereby to cause said phthalocyanine compound to be converted gradually into successively higher chlorination stages, and then treating the mass with a fluidizing gaseous chlorinating mixture whose chlorine concentration is between 80% and 100%, while maintaining the reaction mass at a temperature of about 410° to 430° C. for at least two hours, whereby to cause the pigment to reach the highest chlorination stages.

9. A process as in claim 8, the inert gas being hydrogen chloride.

10. The process of producing a polychloro metal-free phthalocyanin, which comprises treating metal-free phthalocyanine in dry, finely divided state and while extended over the surface of a granular alkali-metal chloride with a fluidizing gaseous stream comprising chlorine and an inert gas at a temperature increasing gradually from about 135° C. to about 300° C., whereby to cause said phthalocyanine compound to be converted gradually into successively higher chlorination stages, and then treating the mass with a fluidizing gaseous chlorinating mixture whose chlorine concentration is between 80% and 100%, while maintaining the reaction mass at a temperature of about 360° C. to 380° C.

for at least one hour, whereby to cause the color to reach the highest chlorination stages.

GEORGE BARNHART.
ROBERT WARREN GRIMBLE.

REFERENCES CITED

The following references are of record in the file of this patent:

UNITED STATES PATENTS

| Number | Name | Date |
|---|---|---|
| 2,020,431 | Osborne et al. | Nov. 12, 1935 |
| 2,214,469 | Linstead et al. | Sept. 10, 1940 |
| 2,276,860 | Niemann et al. | Mar. 17, 1942 |
| 2,402,167 | Lang | June 18, 1946 |

OTHER REFERENCES

Berkman et al.: "Catalysis," Reinhold Pub. Co., New York (1940), pp. 426–428.

F. I. A. T. Final Report No. 1313 (Feb. 1, 1948), pp. 285–290.